May 1, 1962   J. M. WATERMAN   3,031,793
ANIMAL TRAPS
Filed May 14, 1958   4 Sheets-Sheet 1
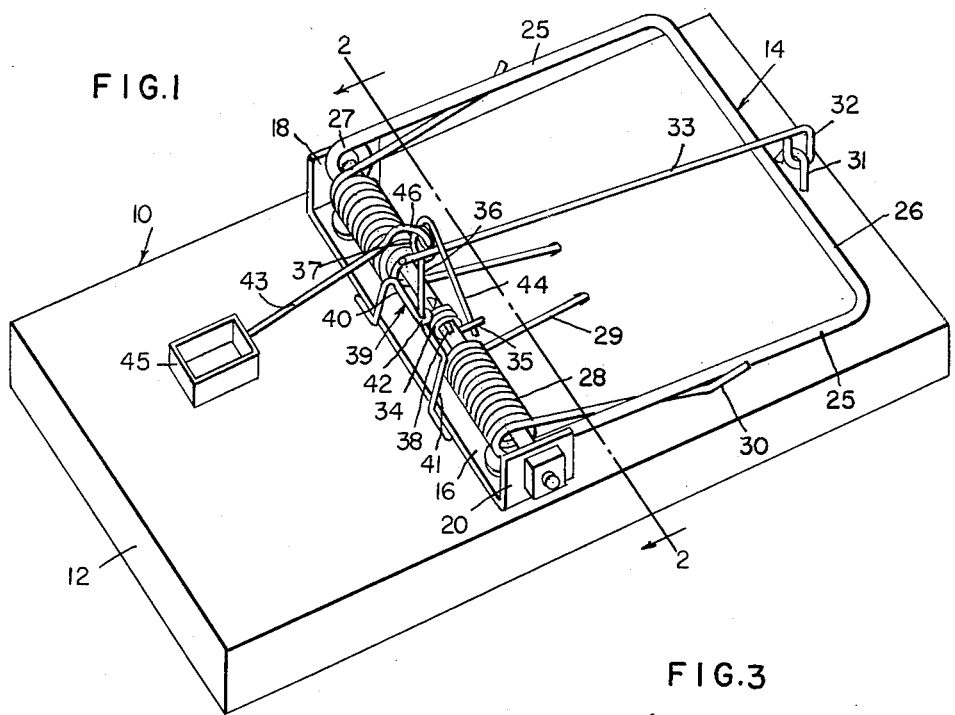
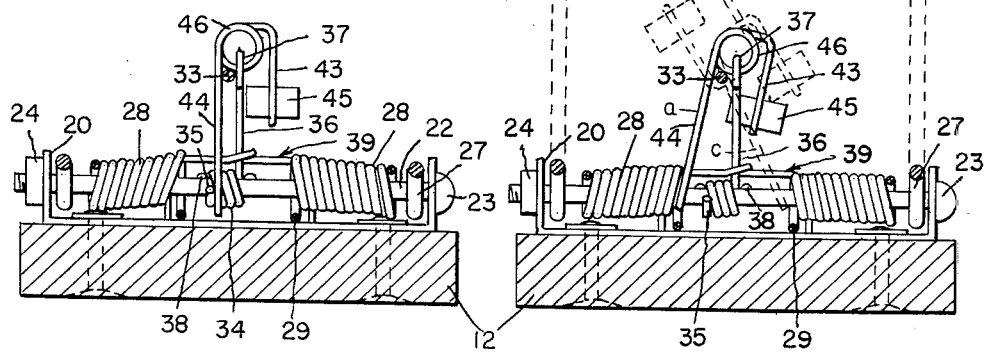
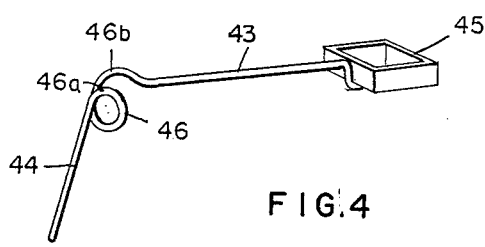
INVENTOR.
John M. Waterman
BY
Shoemaker + Mattare
ATTYS

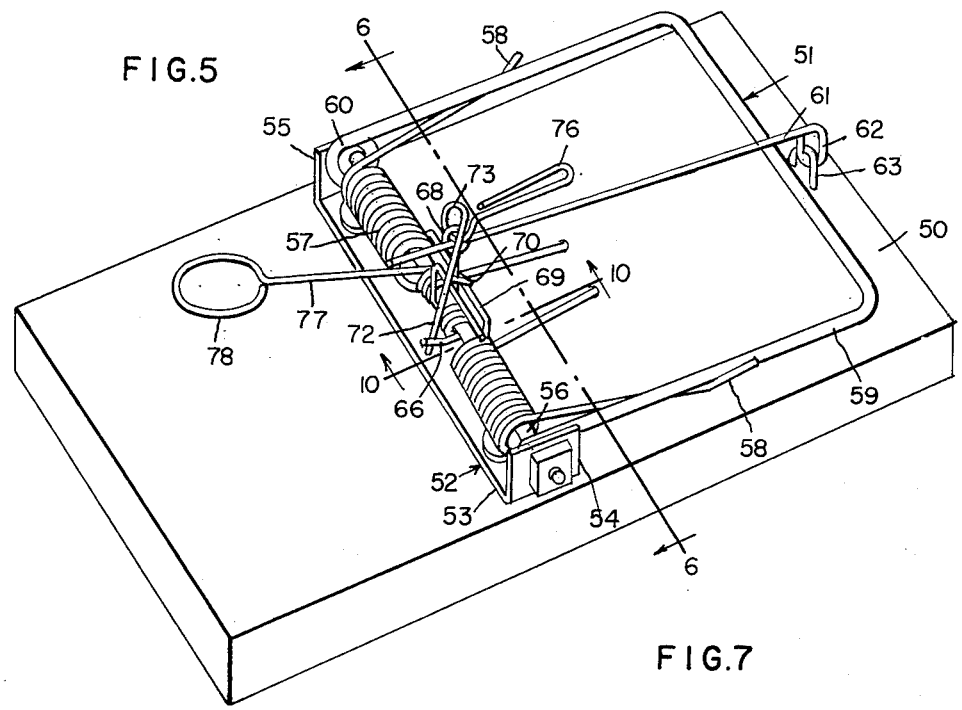
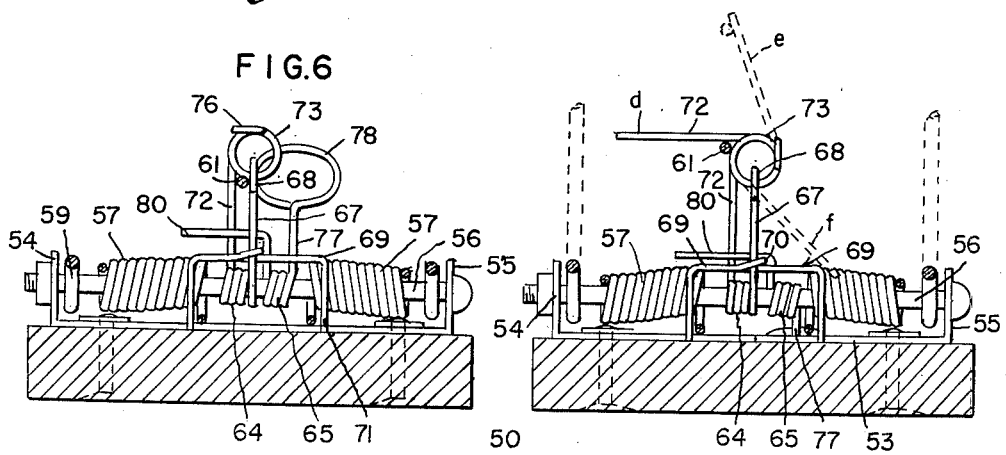
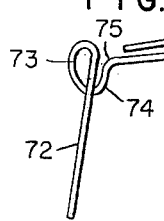
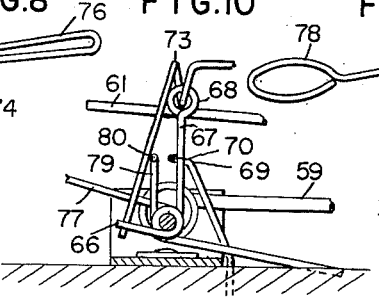
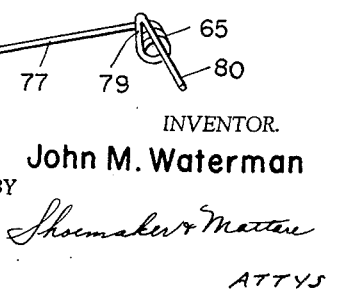
INVENTOR.
John M. Waterman

May 1, 1962  J. M. WATERMAN  3,031,793
ANIMAL TRAPS
Filed May 14, 1958  4 Sheets-Sheet 3
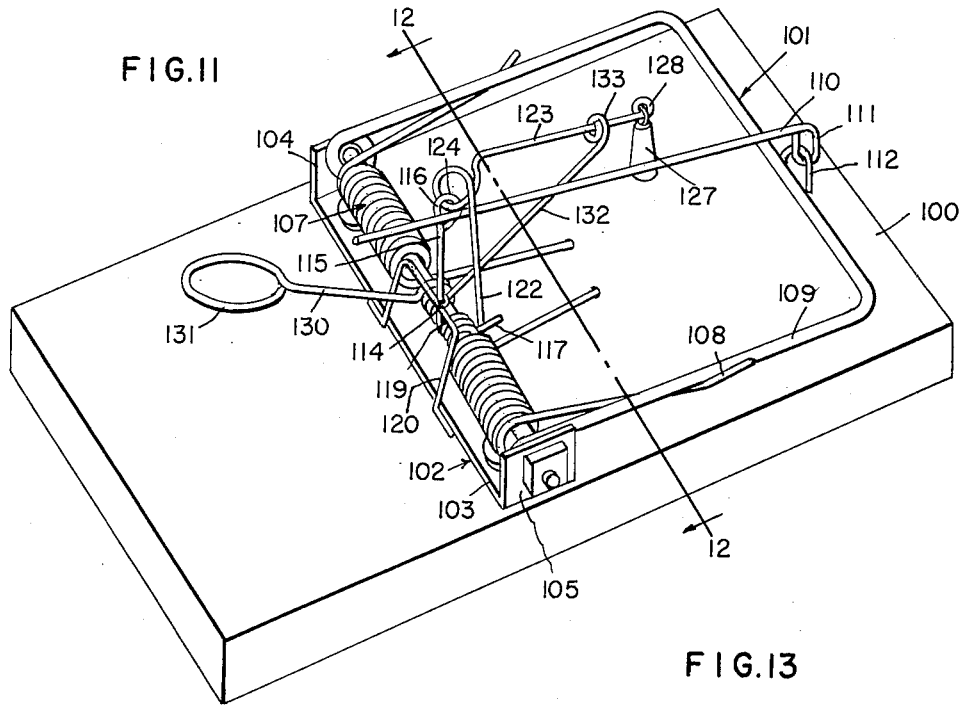
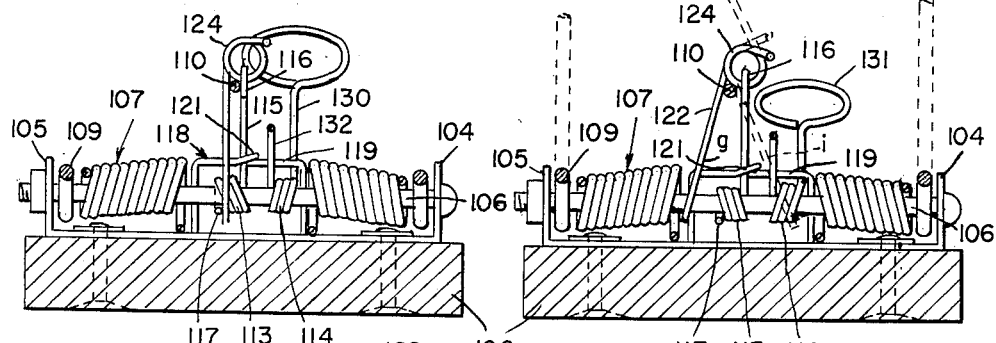
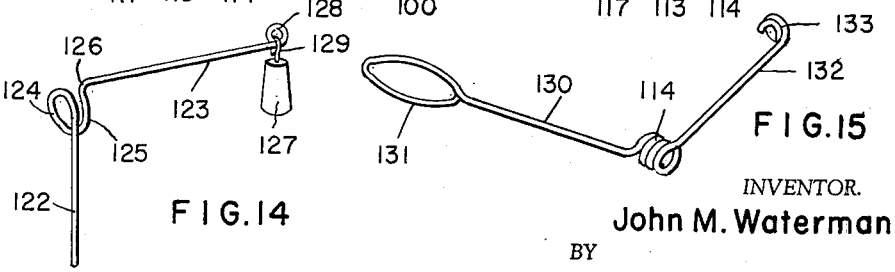
INVENTOR.
John M. Waterman
BY
Shoemaker + Mattare
ATTYS

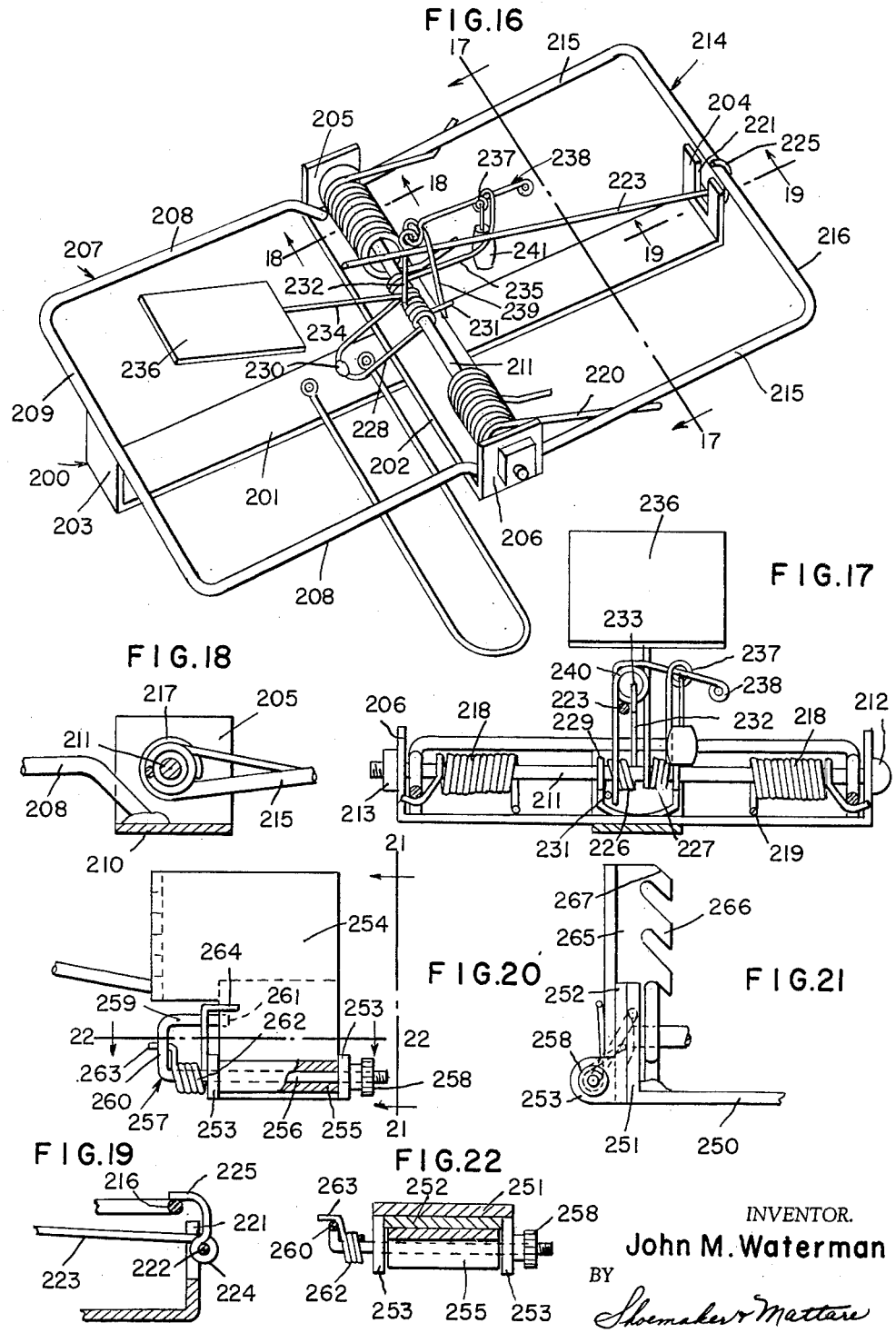

United States Patent Office 3,031,793
Patented May 1, 1962

3,031,793
ANIMAL TRAPS
John M. Waterman, 302 Gulf Drive,
Bradenton Beach, Fla.
Filed May 14, 1958, Ser. No. 735,218
18 Claims. (Cl. 43—81)

This invention relates generally to the class of fishing and trapping and is directed particularly to animal traps and has for a particular object to improve the trigger mechanism for traps of the type embodying a spring driven pivoted striker.

Many different forms of traps of the spring driven type have been designed with a view to improving the action of the trigger mechanism. It will, of course, be readily apparent that in all types of traps, and particularly those of the spring driven striker type, it is very important that the trigger mechanism be very carefully or accurately balanced so that the trap will be sprung at the slightest touch. While traps of the present known type work with a degree of efficiency when new, the efficiency of the trigger mechanism rapidly decreases after the trap has been used a number of times, due to wear and rusting of parts.

In addition to the foregoing, traps of the character described, when designed for catching animals such as rats and larger animals, employ strong heavy springs and the trigger mechanism is frequently of such character that the setting of the trap involves a certain degree of danger to the trapper.

It is a particular object of the present invention to provide a trap of the type having a spring driven striker, with a new and improved trigger mechanism for holding the striker and the striker hold-down element, which mechanism is extremely sensitive but at the same time can be set with a minimum of danger to the trapper.

Another object of the invention is to provide in a manner as hereinafter set forth, a new and improved trigger mechanism wherein a trigger finger which holds the trap set by restraining a hold-down bar for the striker, when tripped, has a "roll over" action which very rapidly removes the finger from the path of movement of the hold-down bar so that the striker can be released and can operate with maximum speed.

Another object of the invention is to provide a new and novel trigger mechanism for a trap of the type stated, having cooperating parts which are engaged one with the other in a novel manner whereby a very light pressure upon the trigger will set off the trap.

Still another object of the invention is to provide a trigger mechanism of the character stated, which has an adjustment feature by means of which the degree of sensitivity of the mechanism can be varied.

A still further object of the invention is to provide an improved trap of the character stated having a novel base frame structure which adapts the trap to use under water and also is of a skeleton form whereby it becomes difficult to see when submerged.

Still another object of the invention is to provide a trap of the type having a spring driven pivoted striker with a novel means for engaging and locking the striker after the trap has been sprung so as to prevent the animal from reversely moving the striker against the resistance of the operating spring, and thus effecting its escape.

Numerous other objects and advantages of the invention will become apparent as the description of the same proceeds, and the invention will be best understood from a consideration of the following detail description taken in connection with the accompanying drawings forming part of the specification, with the understanding, however, that the invention is not confined to a strict conformity with the showing of the drawings but may be changed or modified so long as such changes or modifications mark no material departure from the salient features of the invention as expressed in the appended claims.

In the drawings:

FIG. 1 illustrates a first embodiment of the present invention wherein the illustrated trap shown in perspective is also shown in set position;

FIG. 2 is a transverse section taken substantially on the line 2—2 of FIG. 1;

FIG. 3 is a sectional view corresponding to FIG. 2 and illustrating first in full lines and then in dotted or broken lines through several successive positions the action of the rolled over trigger when the trap is sprung;

FIG. 4 is a view in perspective of the trigger, the trigger finger and bait holder formed in this embodiment in one piece;

FIG. 5 is a view in perspective of a second embodiment of the invention wherein the trap is shown set and illustrating the second form or embodiment of the trigger mechanism;

FIG. 6 is a transverse sectional view taken substantially on the line 6—6 of FIG. 5;

FIG. 7 is a sectional view corresponding to FIG. 6 and illustrating the several successive positions assumed by the roll-over trigger finger when the trap is sprung;

FIG. 8 is a view in perspective of the roll-over trigger finger and the grasping means forming a part thereof and employed in setting the trap;

FIG. 9 is a view in perspective of the trigger and bait holder which cooperate with the trigger finger in the action of the trap;

FIG. 10 is a sectional view taken substantially on the line 10—10 of FIG. 5 looking in the direction of the arrows;

FIG. 11 is a view in perspective of a third embodiment of the trap and trigger mechanism, showing the trap in set position;

FIG. 12 is a transverse sectional view taken substantially on the line 12—12 of FIG. 11;

FIG. 13 is a view corresponding to FIG. 12 and illustrating the several successive positions assumed by the trigger finger in the roll-over action thereof when the trap is sprung;

FIG. 14 is a view in perspective of the trigger finger of the third embodiment showing the balance weight associated therewith;

FIG. 15 is a view in perspective of the trigger, bait holder and trigger lever of the third embodiment;

FIG. 16 is a view in perspective of a fourth embodiment of the invention designed particularly for use in marshy areas or in streams, as for catching muskrats and other water loving animals;

FIG. 17 is a transverse sectional view taken substantially on the line 17—17 of FIG. 16;

FIG. 18 is a sectional view taken substantially on the line 18—18 of FIG. 16;

FIG. 19 is a sectional view taken substantially on the line 19—19 of FIG. 16;

FIG. 20 is a detail view illustrating a striker arm locking means, the stucture being shown as it would appear when viewing the trap from one side;

FIG. 21 is a view of the striker locking mechanism as seen from the plane of line 21—21 on FIG. 20, looking in the direction of the arrows.

FIG. 22 is a sectional view taken substantially on the line 22—22 of FIG. 20.

Referring now more particularly to the drawings, reference will first be made to the first embodiment of the invention as illustrated in FIGS. 1 to 4, wherein the numeral 10 designates in a general manner a trap of well known form in which a spring driven striker embodies a part therof. In this trap structure the numeral 12 designates a base which is customarily in the form of a rectangular block or board of wood while the striker is generally designated 14 and is mounted on the base for action in the manner about to be described.

Secured transversely of the base upon the top thereof and approximately midway between its ends is a mounting cradle for the striker 14 which embodies a strip of metal 16 having at its opposite ends the turned up ears 18 and 20.

Extending between and supported by the ears 18 and 20 is a shaft 22 which has its ends extended through apertures, not shown, in the ears and in the illustrated construction this shaft is in the form of a bolt having a head 23 at one end which engages against the ear 18 while the opposite end receives a nut 24 which bears against the outer side of the ear 20 to secure the shaft in position.

The striker 14 is in the form of a substantially square U-frame having the side arms 25 and the cross connecting bar 26 therebetween and the ends of the arms 25 are fashioned to provide hinge ears 27 which are positioned against the inner sides of the mounting cradle ears 18 and 20 and have the shaft 22 passing therethrough. The shaft 22 supports the two heavy coiled springs 28 whihc are of duplicate form of construction and are located adjacent opposite ends of the shaft with a space between their inner ends and the inner ends of these springs have the base engaging terminal portions 29 while the outer ends have the tangentially extending long striking bar engaging terminals 30 each of which extends across a side member 25 of the striker bar on the underside of the latter when the trap is set and in this position the springs 28 are twisted and under tension so that when the release mechanism permits the trap to be sprung, the springs will throw the striker bar over to the opposite end of the base.

The numeral 31 designates an attachment staple to which is connected the eyed end 32 of the striker hold-down arm 33.

The trigger mechanism embodies a sleeve 34 which encircles the shaft 22 on approximately the longitudinal center of the trap base and between the inner ends of the springs 28 and this sleeve carries a short trigger finger keeper 35 which extends tangentially therefrom toward the end of the trap in which the staple 31 is secured.

Also joined to the sleeve 34 is an upstanding post 36 which has an eye 37 at its top end.

The sleeve 34 may be maintained in its centralized position on the shaft in any suitable manner as by upsetting portions of the shaft forming the short lugs 38, or any other suitable means may be employed for this purpose.

The sleeve 34 is here shown as formed of wire of which a short terminal portion forms the keeper 35 while an opposite end portion forms the upstanding post 36 from which the eye 37 is fashioned.

Suitable means consisting of a safety device with built in ring is provided for holding the sleeve 34 so that the post 36 maintains its upright position and the finger 35 maintains its substantially horizontal position directed toward what may be termed the rear end of the trap base, by which is meant that end in which the staple 36 is secured. The means for holding the sleeve in the position shown is here disclosed as in the form of an inverted U-frame 39 having the horizontal portion 40 arranged in spaced parallel relation with the shaft 22 and having the end leg portions 41 secured in the base 12 and the upstanding post 36 lies against the horizontal portion 40 and is held thereto by a built in collar or ring 42. This, of course, is the best of different means which might be employed for holding the post 36 and finger 35 in place but, of course, the invention is not limited to this specific arrangement.

The post 36 forms the support for the novel roll-over trigger structure about to be described, the eye portion 37 constituting one element of a hinge-like arrangement.

The numeral 43 designates a relatively long trigger which is formed of a suitable wire with which is also formed as an integral part thereof the trigger finger 44. As shown in FIG. 4, the trigger 43 and trigger finger 44 are all in one piece or constitute a single wire element, the trigger finger forming one long terminal portion of the wire element, while the opposite terminal portion is employed for supporting the bait for the trap, which is designed for use with or without bait. In the construction here illustrated, the bait supporting means is shown as being in the form of a pan 45 which is secured to the end of the trigger 43 in a suitable manner.

The trigger 43 and trigger finger 44 have an angular relationship, forming a very nearly right angle, and the connection between these two parts at the angle is in the form of a single convolution loop 46 which lies in a plane which is substantially perpendicular to the trigger 43. One end of the convolution forming this loop leads directly into the inner end of the trigger finger at 46a, while the opposite end of the convolution overlaps and is spaced from the end 46a and then arches outwardly as indicated at 46b and extends away from the overlapped side of the convolution to join the inner end of the trigger 43.

The single convolution loop 46 passes through the eye 37 of the post 36 so that when the trigger mechanism is in action, the loop 46 turns or rotates through the supporting post eye 37.

In the operation of this first embodiment of the invention, when the trap is being set, the striker 14 is swung over toward the rear in the customary manner to twist and tension the springs 28 and when the cross bar 26 of the striker is in position adjacent to the top of the base and on the forward side of the staple 31, the hold-down arm is swung down over the bar 26 and the free end of the arm is brought to position against the side of the post 36 nearest to the keeper 35. The trigger finger is then swung over the hold-down arm so as to catch the arm between the finger and the adjacent side of the post and the arm will thus be located against the underside of the convolution 46 which can be flattened and made straight like a roller bearing, if desired, on its lower side which contacts the long lever 32, as shown in FIGS. 1 to 3. However, whether round or flattened, it works perfectly. The free end of the trigger finger is then placed against the side of the keeper 35 which is nearest to the post 36 and the upward straining of the hold-down arm under the pressure imposed thereon by the spring-urged striker will force the free end of the trigger finger outwardly against the keeper 35. The trigger 43 and bait pan will then be in elevated substantially horizontal position ready for the springing of the trap.

With the trigger parts in the relative positions illustrated and above described, it will be seen that when an animal touches the outer end of the trigger carrying the bait in the bait pan, a very slight downward pressure on the bait pan will rock the convolution 46 of the mechanism on the hold-down arm and the free end of the trigger finger will slide rearwardly and upwardly to snap off the free end of the short keeper 35. When this occurs the force applied against the side of the trigger finger and the convolution 46 will cause the entire trigger finger to roll over laterally, thus rapidly moving the trigger finger out of the path of the hold-down arm so that the springs 28 can throw or drive the striker over in the customary manner.

FIG. 3 illustrates several positions through which the trigger finger and the bait pan pass in the roll-over action. In this figure the trigger finger in position a has just been freed from engagement with the keeper 35. At b it will be seen that the finger has swung up and is swinging over toward the outer side of the trap and the hold-down arm is being released from under the trigger finger. At c the trigger finger is shown as completely rolled over and, of course, the striker is fully released and is in the process of swinging over on the shaft 22 to strike whatever has touched the pan to spring the trap.

Referring now to FIGS. 5 to 10, a second embodiment of the trigger mechanism is illustrated in association with the fundamental trap parts illustrated and described in connection with the first embodiment. Here in this second embodiment the trap base is designated 50. The numeral 51 generally designates the striker and the mounting cradle for the striker is designated 52 and as in the preceding structure, embodies the base portion 53 and the upstanding ears 54 and 55 between which is supported the shaft 56.

The striker driving springs are designated 57 and as in the previous structure, the outer end of each of these springs has a long terminal portion 58 which engages against a side arm 59 of the U-shaped striker so as to rotate the striker on the shaft by means of the looped end portions 60 of the side arms 59, through which the shaft 56 passes.

The striker hold-down arm is here designated 61 and is connected to the base by means of the eye 62 engaged through the staple 63.

In this second embodiment of the trap structure, more especially the trigger mechanism therefor, the trigger mechanism embodies two sleeve members 64 and 65 which are mounted coaxially in side-by-side relation upon the shaft 56 between the springs 57. Here the trigger and trigger finger are separate elements instead of being formed from one piece of material as in the preceding structure, as hereinafter described.

The sleeve 64, which is here illustrated as being formed by several convolutions of wire material, terminates at one end in the short trigger finger keeper 66 while the opposite end is extended vertically to form the trigger finger supporting post 67 which terminates at its top in the eye 68.

The post 67 is maintained in vertical position in a suitable manner as, for example, by the disposition at one side of the shaft of a frame of inverted U-shape having the horizontal portion 69 to which the post 67 is secured by a built-in eye 70 or in any other suitable way, and having the shouldered leg members 71 which extend downwardly and are secured to the base 50 by clinching. The post 67 is disposed upon the side of the shaft nearest to the staple 63 or what has been previously identified as the rear end of the base, while the trigger finger keeper 66 normally extends in the opposite direction or toward the forward end of the trap, substantially horizontally or it may be slightly upwardly inclined as found most suitable, or curved in true or eccentric circular shape.

The trigger finger is designated 72 and one end of the finger joins an end of a single convolution loop or coil 73. The opposite end of this single convolution loop or coil lies along a portion of the end of the trigger finger 72 from which the first end of the coil leads, as indicated at 74, and then turns sharply away from the single convolution and from the end of the trigger finger, as indicated at 75, to join an end of a holding arm 76. As will be seen, the trigger finger 72 actually constitutes a tangential continuation of the coil or loop 73 while the arm 76 extends at right angles or at approximately right angles to the trigger finger and perpendicular to the plane of the loop or coil convolution.

The single convolution loop or coil 73 passes through the eye 68 at the top of the post 67 and turns in this eye in the rolling action of the trigger finger like a roller bearing at first and then rolling over when the latter is released in the springing of the trap.

The second sleeve which is designated 65, while it may be formed as a single tubular member, is illustrated as being in the form of several coils or convolutions of wire and when formed from this material and in this manner, one end portion is extended to substantial length to form the trigger 77 which terminates in a suitable bait carrying means 78, here shown as in the form of a looped portion of the wire. The other end of the sleeve 65 has a portion 79 extending tangentially therefrom and substantially perpendicular to the trigger 77 and this portion 79 is continued in a lever arm or trigger lever 80 which is also substantially perpendicular to the trigger 77 but which extends in a direction substantially parallel to the axis of the sleeve and away from the trigger.

It will be seen from the foregoing and upon reference particularly to FIGS. 5 to 7 of the drawings, that the trigger lever will extend perpendicularly to the post 67 and is disposed on the opposite side of the shaft 56 from this post.

In the operation of this second embodiment of the trap and trigger mechanism, when the striker hold-down arm 61 is brought into position with its free end over the shaft 56 in order to hold the striker against the tensioned springs 57, the trigger finger is swung over by means of the arm 76 so as to place it across the hold-down arm 61 on the side of the latter away from the eye 68. In other words, the free end of the holddown arm will be positioned between the trigger finger 72 and the adjacent side of the post eye 68. The trigger finger will, of course, be directed downwardly and it will be located in front of the trigger lever 80 with its lower end against the side of the keeper 66 nearest to the hold-down arm. In positioning the trigger finger against the forward side of the trigger lever 80, the step on pan or bait holding loop 78 with the trigger 77 will be elevated and the lower end of the trigger finger may conveniently be positioned against the side of the keeper adjacent to the end of the latter. The upward thrust applied to the trigger finger by the hold-down arm, particularly the thrust as it is applied to the outer or convex side of the single convolution loop, will tend to force the trigger finger laterally against the keeper 66. Upon the application of pressure to the bait holding end of the trigger 77 or to any part of the trigger, the trigger will rock the sleeve 65 and force the lever 80 forwardly against the trigger finger and this will slide the lower end of the trigger finger off the end of the keeper 66. This will then permit the hold-down arm 61 to roll the entire trigger finger and arm 76 upwardly and laterally over, so as to completely and rapidly release the hold-down arm and consequently permit the springs 57 to drive the striker in the desired manner.

The movements imparted to the trigger finger by the thrust of the hold-down arm 61 against the upper end of the trigger finger and against the lower side of the single convolution loop or coil 73, when the trap is sprung, are illustrated in FIG. 7. In this figure the trigger finger is shown in one position *d* in its upward swinging movement, and in broken lines in two succeeding positions *e* and *f*, showing the path of movement which the finger takes in the roll-over action in moving out of the way of the hold-down arm 61, which movement is, of course, imparted to the finger by the hold-down arm. Friction in this release movement is very low, almost no friction.

FIGS. 11 to 15 illustrate a third embodiment of the invention. In these figures, as will be readily seen, the elements of the trap embodying the base and the striker, the striker support and driving springs are the same as in the other embodiments. Accordingly these parts will only be generally referred to.

The numeral 100 designates the base on which is mounted transversely of the top thereof the mounting cradle for the striker 101. This mounting cradle, which is generally designated 102, embodies the plate 103 having the upturned end ears 104 and 105 through which extend the ends of the shaft 106.

The striker driving springs are designated 107 and are mounted on the shaft 106 in spaced relation with one another and each has a portion of its outer end extended to provide the arm 108 which engages an adjacent side 109 of the substantially U-shaped striker 101.

The striker hold-down bar is designated 110 and is engaged by the eye 111 with the staple 112 secured to the top of the trap base 100 at the rear end of the base.

Supported on the shaft 106 between the springs 107 are the two sleeves 113 and 114. While these sleeves may be in the form of solid tubular bodies through which the shaft 106 passes, they are here shown as in the previously described embodiments of the invention, as being formed by a number of turns or convolutions of wire material the ends of which convolutions are extended to form the other elements of the trigger mechanism in the manner about to be described.

The sleeve 113 has a portion of one end extended vertically to form the trigger finger supporting post 115 which terminates at its top end in the eye 116, while the opposite end of the sleeve 113 is extended to form the short trigger finger keeper 117.

The post 115 is maintained in vertical position by means of an inverted substantially U-shaped frame 118 having the bar portion 119 which extends across the post and the downwardly extending legs 120 which are secured to the base 100 as shown in FIG. 11 and the post 115 is secured to the bar 119 in a suitable manner as by means of a built-in ring 121 or the like.

While in this third embodiment of the invention and the preceding embodiments, the trigger finger supporting posts have been described as maintained in proper upright position by a frame unit which is secured to the base and which has a horizontal part secured to the post by a built-in and shouldered substantially U-shaped wire piece ring, it will be understood that any other suitable means may be employed for maintaining the trigger finger posts in desired position and that the invention is accordingly not restricted to the use of the frames and rings for holding the posts in place, but this means is highly desirable as it gives just the right amount of adjustability to the trigger action.

The trigger finger of this third embodiment is generally designated 122 and is formed of a suitable length of wire which is connected in substantially right angular relation with a long arm 123 through the intermediate single convolution loop or coil 124.

As in the trigger finger construction described in the preceding embodiments, one end of the finger 122 is connected to an end of the coil convolution 124 and the other end of the convolution lies alongside of this one end of the trigger finger as indicated at 125 and then joins the arm 123 by a sharp bend 126 which leads away from the coil convolution so that the arm extends in a direction perpendicular to the plane of the convolution 124.

At the free end of the arm 123 a light balance weight 127 can be attached, if desired, in a siutable manner as, for example, by means of an eye 128 formed from the end of the arm and a corresponding eye 129 carried by the balance weight to counterbalance the weight of the bait or step on pan.

The wire coil sleeve 114 has one end extended to form the trigger 130 the outer or free end of which is designed in a suitable manner to support bait, if desired, as for example, it may be in the form of a loop 131 or a pan or plate may be attached thereto as desired, as in the structure shown in FIGS. 1 and 14.

The other end of the sleeve 114 is extended to form the trigger lever 132 which at its free end is shaped to form a guide sleeve 133. The trigger 130 and the lever 132 are arranged to form a wide obtuse angle and when the sleeve 114 is in position upon the shaft 106, the trigger 130 extends upwardly and forwardly over the trap base while the lever 132 extends upwardly and rearwardly and the counter-balanced trigger finger arm 123 is slidably extended through the guide sleeve 133 as shown in FIG. 11. Accordingly it will be seen that when the trigger 130 is swung so as to rock or turn the sleeve 114, the outer end of the lever 132 will be raised and lowered and will impart corresponding movements to the trigger finger arm and it will also be seen that the positions of the guide sleeve 133 and the trigger finger arm 123 are such that the trigger finger can roll over laterally by turning the single convolution loop or coil in the post eye 116 without restriction from the guide sleeve 133, which constitutes a unique and ingenious release mechanism.

In the operation of this third embodiment of the trap, when the trap is set the hold-down arm 110 will be brought into position at its free end against one side of the eye 116 and the trigger finger 122 will then be swung or rolled over until it extends downwardly toward the base of the trap to lie across the hold-down arm 110 on the side of the latter opposite or away from the eye 116. The arm will then, of course, be held between the trigger finger and the adjacent side of the post carried eye 116. The lower end of the trigger finger is then engaged against the side of the keeper 117 which is nearest to the hold-down arm and to the post 115. It will be seen that in this arrangement, as in the previous ones, the upward thrust of the striker hold-down arm against the upper end of the trigger finger and the adjacent side of the convolution coil or loop will tend to force the trigger finger laterally but this will be opposed by the keeper 117 with which the lower end of the trigger finger is engaged.

In the springing of the trap, when pressure is applied to the trigger 130, tending to cause it to swing down thus turning the sleeve 114 on the shaft, the trigger lever 132 will have its outer end swung upwardly and will raise the trigger finger arm and thus swung the trigger finger so as to disengage its lower end from the keeper 117, permitting the trap to operate in the obvious manner. As soon as the trigger finger slides off of the end of the short keeper finger 117, the upward push of the striker hold-down arm will cause the trigger finger to swing upwardly and roll over laterally, as will be readily obvious, and as is illustrated partly in full lines and partly in broken lines in FIG. 13. In this figure, the trigger finger is shown in full lines in a position $g$ to which it moves immediately after disengaging from the keeper. It will be seen that its movement is in the form of an arc, being upwardly and over the top of the post eye 116, a second position $h$ being shown in broken lines where the hold-down lever is about to disengage from the trigger finger and a third position $i$ showing the end of the roll-over movement of the trigger, at which time the trap striker will have completed its function under the urging of the coil springs 107.

FIGS. 16 to 19 illustrate a fourth embodiment of the invention, which embodiment shows a different type of base support for the mechanism as well as a slightly modified trigger mechanism construction.

The form of the trap shown in these last mentioned figures is such as to make it particularly well adapted for use in trapping animals such as muskrats and the like which live a great deal of the time in water, since this last embodiment of the invention is constructed so that it will maintain a stable position at the bottom of a stream or on the bottom of a marshy area and its design is such that when on the bottom of a stream or march, it will be less conspicuous than a trap having a large solid or one-piece rectangular base, and is easily concealable.

The base of the fourth embodiment of the invention, generally designated 200, is of substantially cruciform design, in that it embodies a long flat bar 201 having secured transversely thereof at approximately midway between its ends, the transverse cross arm 202 which is also in the form of a flat bar and these bars are secured together by welding or in any other suitable manner.

The long base bar 201 has its forward and rear ends upturned to form the short upstanding tongues 203 and 204 respectively, and the cross bar 202, which is of materially less length than the longitudinal bar 201, also has the upturned end tongues 205 and 206. Also forming a part of the base is an open forward end frame 207 which is of U-form and embodies the side members 208 and the cross connecting member 209 and this cross member 209 is disposed upon and secured to the edge of the tongue 203 while the side members 208 extend rearwardly and terminate against the inner sides of the tongues 205 and 206 of the cross arm bar 202, to which they are welded, as indicated at 210 in FIG. 18.

Thus the frame in its overall design embodies the cruciform base portion as well as the U-frame part 207 which latter part being of rod-like construction makes the structure particularly strong and rugged without adding materially to the size or weight.

The tongues 205 and 206 are apertured to receive the ends of a cross shaft 211 which, as in previously described forms of the invention, has a head 212 on one end, which in the present illustration bears against the outer side of the tongue 205 while its opposite end which passes through the tongue 206 has threaded thereon the nut 213 which bears against the tongue 206 to hold the shaft in position.

The numeral 214 generally designates the striker which, as in the previously described forms, is substantially U-shaped and embodies the side members 215 and the cross connecting bar 216, while the free ends of the side members are formed to provide the hinge eyes 217 which have the shaft 211 extended therethrough so that the striker may rotate on the shaft under the urge of the driving springs 218. These springs are of the coil type and each has an inner end portion 219 which bears against the cross arm bar 202 while the outer end of each spring is extended to provide the striker engaging portion 220.

The dimensions of the striker 214 are such that when the striker is swung over on the shaft 211 to the set position, the cross bar portion 216 of the striker will be located adjacent to the top edge of the tongue 204 for engagement by the part of the hold-down arm about to be described.

The tongue 204 is slotted, as indicated at 221, and secured across this slot is a pin 222.

A hold-down under-slung style arm lever 223 may be of any suitable shape desired, but underslung so that it releases striker 214 by a slight up and down movement and is totally concealable when the trap is set. This hold-down lever arm 223 is formed at the end which is attached to the tongue 204 to provide the hinge ring 224 through which the pin 222 extends and this ring 224 has an end which is extended upwardly and shaped (see FIG. 19) to provide the hook 225 which is directed forwardly and is adapted to engage over the bar portion 216 of the striker when the striker is in the trap-set position with the arm 223 extended forwardly for connection with the trigger mechanism.

The shaft 211 supports in the central part thereof between the springs 218, the two wire coil sleeves 226 and 227.

In the previously described forms of the invention the sleeves corresponding to those here illustrated and designated 226 and 227 were described as being maintained in position or against movement longitudinally on the supporting shaft, by struck-up portions or lugs on the shaft, but in the present construction the means illustrated for maintaining the sleeves in place comprises an elongate wire loop 228 having portions of the ends thereof wrapped around the shaft 211 at the outer sides or outer ends of the sleeves 226 and 227, as indicated at 229, and the loop can be secured against movement on the shaft 211 by attaching it to the base bar 201 as by riveting or in any other suitable manner as indicated at 230, but tension will hold it in proper position.

The sleeve 226, which is formed of a number of convolutions of wire, has one end extended toward the rear of the trap to form the trigger finger keeper 231 while the other end of the sleeve is extended to form the post 232 which terminates in an eye 233.

The sleeve 227, which is also formed of a number of convolutions of wire material, has one end extended to form the trigger 234 which is directed toward the front end of the trap while the opposite end of the sleeve 227 is continued rearwardly and upwardly in a curved lever 235 which is swung up and down with the up and down movements of the trigger and which lever functions to trip the mechanism when the trigger is depressed in the manner hereinafter described.

The forward or free end of the trigger 234 carries a bait pan 236 which is here shown as in the form of a flat plate, and this plate may have its surface finished so as to have a polish which will cause a reflection of light through the water when the trap is set beneath the surface, to attract the curiosity of an animal and lead it to an investigation which will result in the springing of the trap.

The outer curved end portion of the trigger lever 235 is formed to provide a guide sleeve 237 through which is slidably extended an elongate arm 238 forming a part of or connected with the trigger finger 239. This trigger finger 239, which together with the arm 238, is formed of wire material, joins at its upper end with a single convolution coil 240 which is approximately the same form or design as the coil 124 and this coil is engaged through the eye 233 at the top of the post 232. The arm 238 thus extends rearwardly from one side of the coil and extends substantially perpendicular to the plane of the coil so that when the trigger finger is in its downwardly extended position which it assumes when the trap is set, the arm 238 will extend rearwardly and this arm 238 is also substantially parallel to hold-down lever 223 when the trap is set.

The two-eyed guide sleeve 237 of the trigger lever can have, if desired, attached thereto and suspended therefrom a counterbalancing weight 241, which is suspended from the lower eye to counterbalance the weight of the pan or bait, if used.

It is believed that the manner of setting and operating this fourth embodiment of the trap will be readily apparent from the foregoing description. When the striker 214 has been swung over to set position, which action twists and tensions the springs 218, the hook 225 of the hold-down arm will then be engaged across the top of the bar 216 and the forward free end of the arm 223 will be placed against the side of the eye 233 which is nearest to the trigger finger keeper 231. The trigger finger is then rotated over to swing the trigger finger down to a vertical position across the side of the hold-down arm opposite from the eye 233 and the lower end of the finger is engaged against the side of the keeper which is nearest to the hold-down arm and the latter arm will then function to impose an upward thrust on the trigger finger so as to hold it firmly against the keeper.

The trigger 234 and the bait pan will be elevated so that when the trigger is pushed down, the lever 235 will push up on the trigger finger arm and rock the latter to disengage it from the keeper 231, thus permitting the trigger finger to roll over and release the hold-down arm 223 in an obvious manner.

It will be noted that the striker, when in set position, imposes an upward pressure against the hook 225 and, due to the manner in which this hook and the hold-down arm 223 are pivoted, this pressure will constantly urge the forward end of the hold-down arm upwardly against the upper end portion of the trigger finger and the underside of the adjacent loop 240. Thus as soon as the lower end of the trigger finger is detached from the keeper 231, the hold-down arm will kick upwardly to spring the trap.

FIGS. 20 and 21 illustrate a mechanism which is adapted to be combined with the trap structure shown in FIG.

16 by means of which the striker will become locked when it is driven over by the springs 218 upon the springing of the trap, to prevent an animal caught between the jaw-forming bar 216 and the bar 209 from forcing up the striker against the resistance of the spring and escaping. In these FIGURES 20 and 21, the numeral 250 represents the cross bar or cross arm bar 202 of the trap shown in FIG. 16 and the numeral 251 designates an upturned ear at one end of this cross bar. The striker locking means comprises a plate 252 which is secured, as by welding, to the outer side of the ear 251 and this plate carries adjacent to the bottom edge and on its two opposite sides the laterally extending hinge ears 253.

The numeral 254 designates the lock plate which has a portion of its bottom edge formed to provide a sleeve bearing 255 which is positioned between the ears 253 and there is extended through the ears 253 and the hinge sleeve bearing 255 the long shank portion 256 of a J-bolt 257. The free end of this shank 256 is screw threaded to receive a binding nut 258 which bears against the adjacent hinge ear 253, while the opposite end of the shank extends a slight distance beyond the other hinge ear 253 and the bill end 259 of the J-bolt which is connected by a short intermediate portion 260 with the shank 256 has its end fixed in an aperture 261 in the adjacent edge of the ear 251. The portion of the shank 256 lying between the short right angularly extending part 260 and the adjacent hinge ear 253 has wound therearound a coil spring 262. One end of this spring, designated 263, is engaged across one side of the angle portion 260 of the J-bolt while the other end of the spring, designated 264, is disposed against the outer side of the lock plate 254. The spring 262 is biased to constantly urge the lock plate 254 to upright position against the plate 252 and when the lock plate 254 is swung outwardly on the pivot bolt away from the plate 252 the spring 262 will be placed under tension.

A portion of that side edge of the lock plate 254 which is directed toward the front end of the trap over a side member 208 of the trap frame part 207, carries a toothed or ratchet flange 265 which projects inwardly across the adjacent member 208 when the lock plate 254 is in upright position. The inwardly directed edge of this flange carries a number of vertically spaced inwardly and downwardly sloping ratchet teeth 266 and the topmost one of these teeth has its top edge sloped or inclined inwardly to form a cam surface 267.

In the movement of the striker 214 from the sprung position to the set position, the lock plate 254 must be swung outwardly to remove the ratchet or toothed flange 265 from the path of travel of the adjacent side member 215 of the striker. After the striker has been secured in place by the hold-down arm 223, and the trap is set and maintained ready for action by the trigger mechanism, the lock plate 254 is permitted to return to its normal upright position where the toothed or ratchet flange projects inwardly across the path which the side member 215 of the striker will follow as the striker is swung over under the edge of the operating springs 218.

When the trap is sprung and the striker swings over in the obvious manner, the side member 215 of the striker nearest to the ratchet plate will first strike the cam surface 267 at the top of the ratchet flange and kick the ratchet flange and lock plate outwardly against the tension of the spring 262 and then ride down across the points or ends of the teeth 266 until it comes to rest against whatever may be caught between the jaw bar 216 and the bar 209. If the striker does not stop exactly in the right position for the side member 215 to engage between a pair of teeth, it will be obvious that any attempt on the part of the animal caught under the jaw to raise the striker, will move the side member 215 sufficiently for it to catch between a pair of teeth and thus the striker will be securely locked so that further reverse movement of the striker against the resistance of the springs 218 on the part of the trapped animal will be prevented.

From the foregoing it will be apparent that there are disclosed herein in the embodiments of the invention described, an entirely new and novel trigger mechanism which is of a highly efficient character and which is readily set and at the same time it is a mechanism which will not get out of order by reason of wear or rusting of the parts and is extremely sensitive and rapid in its operation due to the novel roll-over action of the trigger when released. This trigger, it is believed, has the safest and fastest action of any trigger yet devised for the purpose of use with trapping devices and can be adapted for use with automatic fish catching devices, guns, etc., also as an automatic window closer operating the trigger by rain pressure, and other desirable uses, to be determined. The action of the trigger may be a new application of mechanical leverage because if the upright holding the trigger is held at an offset angle other than the normal perpendicular position, the trigger will release the springs of the trap by its weight alone as the long hold-down lever causes the lower side of coil convolution 124 to rotate like a roller bearing, a most interesting phenomenon. The convolution 124 is the key to the novel action of the trigger and it can be fully round or straightened on the lower side, and when straightened a slightly smaller loop will accommodate the hold-down lever 110. Because contacts of friction are point contacts, the friction of trigger operation is as low as possible.

What is claimed is:

1. In a trap, a base, a spring driven striker mounted thereon for movement from a set position to a sprung position, means movably attached to the base for holding the striker set against movement under the action of the spring, a trigger finger support, an elongate trigger finger loosely movably coupled adjacent to one end to the support, a stationary elongate keeper for the trigger finger and positioned to have the trigger finger engaged at one end thereacross, said trigger finger when in engagement with the keeper overlying and holding said movably attached means against movement by the spring urged striker, the said loose coupling between the trigger finger and the support facilitating engagement of the trigger finger in different positions along and against the elongate keeper whereby regulation of the sensitivity of the trap may be effected, and a trigger operatively coupled with said trigger finger for effecting disengagement of the trigger finger from the keeper.

2. The invention according to claim 1, wherein said loose trigger finger coupling with the support permits the trigger finger to execute a free laterally directed upward and over-rolling movement from above and away from the striker holding means when the trap is sprung.

3. The invention according to claim 1, wherein said support embodies a vertical member having an eye upon its upper end and the said loose coupling of the trigger finger to the support is by means of a loop passing through the eye and lying in a vertical plane extending transversely of the trap when the trap is set whereby the trigger finger executes an up-and-over rolling movement approximately in said plane away from the said striker holding means when the trap is sprung.

4. The invention according to claim 1, wherein the said striker holding means comprises an elongate arm having its attachment to the base at one end and having its other end adapted to be positioned at one side of the trigger finger support the elongate trigger finger extending downwardly from said support in the set condition of the trap for the said engagement across the keeper, and said other end of the arm being held in an angle formed between said support and the upper end of the trigger finger when the trap is set.

5. The invention according to claim 1, with means on the base for engagement by the striker upon its pivotal movement to the trap-sprung position for effecting locking of the striker against reverse pivotal movement.

6. The invention according to claim 5, wherein the striker comprises a substantially U-shaped frame having spaced side members and a transverse member therebetween, and said means comprises a plate pivotally mounted at a side of the base adjacent to the pivoted end of one side member of the striker and carrying ratchet teeth movable into and out of the path of movement of said one side member, and spring means yieldingly maintaining the ratchet teeth into said path of movement.

7. In a trap, a base, a shaft supported thereon, a striker comprising a substantially U-shaped frame having spaced side members and cross connecting bar therebetween, the side members being coupled to the shaft for the turning of the striker therearound, spring means for turning the striker on the shaft, a hold-down arm loosely coupled at one end to the base for engagement across said bar to hold the striker in set position against the driving tension of the spring means, a trigger finger suspension means supported on the base and disposed at an elevation above and overlying the shaft, an elongate trigger finger loosely coupled at one end to said suspension means to depend therefrom and having substantially universal swinging movement thereon, a stationary keeper member secured adjacent to the shaft below said suspension means for engagement by the other end of the trigger finger when the later is depending from said suspension means, said hold-down arm being adapted to have its other end retained between the suspension means and said one end of the trigger finger when the trigger finger is in engagement at its other end with the keeper member, and a trigger element movably supported adjacent to and operatively coupled with the trigger finger for effecting movement of the trigger finger out of engagement with the keeper member.

8. The invention according to claim 10 wherein said loop is in the form of a single convolution coil, there being an arm forming an extension of an end of the coil and disposed to lie substantially parallel to the axis of the coil, a sleeve, means supporting said sleeve adjacent to said post for rocking movement on said pivot axis line, said trigger member being joined to and extending from one side of said sleeve, a lever joined to and extending from the opposite side of said sleeve, and means slidably coupling said lever with said arm, and whereby upon rocking of the trigger member and sleeve the arm will be shifted to effect disengagement of the trigger finger from the keeper member.

9. The invention according to claim 8, with a counterbalance weight operatively coupled with said arm.

10. In a trap of the type described, a base, a pivoted spring driven striker and a striker hold-down arm attached to the base; a trigger mechanism comprising an upstanding support member adjacent to the pivot axis line for the striker, an elongate trigger finger having a substantially universal loose coupling at one end with said support member at an elevation above said axis line and adapted to hang at one side of the support member, a short straight keeper member operatively coupled at one end to and supported by the base adjacent to the lower end of said support member and having a free end extending substantially perpendicularly to said axis line, said trigger finger being adapted to have its free end engaged in a selected position of adjustment along and against the side of said keeper member and to secure said hold-down arm in trap set condition, a movable trigger member operatively coupled with the trigger finger and adapted upon a prescribed movement to disengage the trigger finger from the keeper, said support member having an eye lying in a plane perpendicular to said pivot axis and the said loose coupling embodying a loop in the said one end of the trigger finger engaged in the eye and lying in a plane approximately paralleling said axis whereby the trigger finger may execute an upward rollover movement toward a side of the trap when it is released.

11. The invention according to claim 10, wherein said base comprises a long flat bar having an upstanding rear end ear and a short flat transverse bar substantially midway between the ends of the long bar and having lateral upstanding ears, a shaft secured to and connecting said lateral ears, said striker being connected to the shaft to pivot thereon, the attachment of the hold-down arm to the base being a pivot connection with said rear end ear, and a hook carried by the pivoted end of the hold-down arm and adapted to engage and hold the striker in trap-set position.

12. In a trap of the type described, a base, a pivoted spring driven striker and a striker hold-down arm attached to the base; a trigger mechanism comprising an upstanding support member adjacent to the pivot axis line for the striker, an elongate trigger finger having a substantially universal loose coupling at one end with said support member at an elevation above said axis line and adapted to hang at one side of the support member, a short straight keeper member operatively coupled at one end to and supported by the base adjacent to the lower end of said support member and having a free end extending substantially perpendicularly to said axis line, said trigger finger being adapted to have its free end engaged in a selected position of adjustment along and against the side of said keeper member and to secure said hold-down arm in trap set condition, a movable trigger member operatively coupled with the trigger finger and adapted upon a prescribed movement to disengage the trigger finger from the keeper, said support member and said trigger finger being formed as a single element and being joined by a single convolution coil engaged through an eye carried by said support member and forming said loose coupling.

13. In a trap of the type described, a base, a pivoted spring driven striker and a striker hold-down arm attached to the base; a trigger mechanism comprising an upstanding support member adjacent to the pivot axis line for the striker, an elongate trigger finger having a substantially universal loose coupling at one end with said support member at an elevation above said axis line and adapted to hang at one side of the support member, a short straight keeper member operatively coupled at one end to and supported by the base adjacent to the lower end of said support member and having a free end extending substantially perpendicularly to said axis line, said trigger finger being adapted to have its free end engaged in a selected position of adjustment along and against the side of said keeper member and to secure said hold-down arm in trap set condition, a movable trigger member operatively coupled with the trigger finger and adapted upon a prescribed movement to disengage the trigger finger from the keeper, said trigger member and said trigger finger being formed of a single length of wire as a one piece element and the trigger member and trigger finger being joined by a single convolution coil engaged through an eye carried by said support, the said trigger finger constituting a tangential extension of the coil at one end thereof and the trigger member forming an extension of the other end of the coil directed substantially axially thereof.

14. In a trap of the type described, a base, a pivoted spring driven striker and a striker hold-down arm attached to the base; a trigger mechanism comprising an upstanding support member adjacent to the pivot axis line for the striker, an elongate trigger finger having a substantially universal loose coupling at one end with said support member at an elevation above said axis line and adapted to hang at one side of the support member, a short straight keeper member operatively coupled at one end to and supported by the base adjacent to the lower end of said support member and having a free end extending substantially perpendicularly to said axis line, said trigger finger being adapted to have its free end engaged in a selected position of adjustment along and against the side of said keeper member and to secure said hold-down arm in trap set condition, a movable trigger member operatively coupled with the trigger finger and adapted upon a prescribed movement to disengage the trigger finger from the keeper, said trigger finger being supported for rocking movement on an axis paralleling said axis line, said trigger member being connected with said trigger finger to rock therewith and extending approximately at right angles to said axis line, said support member having an eye disposed in a line substantially paralleling said axes, and said trigger finger having a loop at said one end passing through said eye and forming a loose coupling therewith.

15. The invention according to claim 14, wherein said trigger finger loop is in the form of a single convolution coil having an end portion extending in a direction substantially paralleling the axis of the coil and forming an arm facilitating manipulation of the trigger finger in the setting of the trap.

16. The invention according to claim 14, wherein the said trigger member forms an extension of one end of a wire coil sleeve, a trigger lever forming an extension of the other end of the wire coil extending substantially parallel to said axis line for engagement against the trigger finger to impart movement thereto upon actuation of the trigger member, and a shaft having the striker mounted thereon for the said pivoting of the striker and said wire coil sleeve encircling the shaft and rocking thereon.

17. The invention according to claim 14, wherein the said trigger forms an extension of one end of a wire coil sleeve, a trigger lever forming an extension of the other end of the wire coil extending substantially parallel to said axis line for engagement against the trigger finger to impart movement thereto upon actuation of the trigger, a shaft having the striker mounted thereon for the said pivoting of the striker and said wire coil sleeve encircling the shaft and rocking thereon, and said elongate trigger finger loop being in the form of a single convolution coil having an end portion extending in a direction substantially paralleling the axis of the coil and forming an arm facilitating manipulation of the trigger finger in the setting of the trap.

18. In a trap of the type described, a base, a pivoted spring driven striker and a striker hold-down arm attached to the base; a trigger mechanism comprising an upstanding support member rising from said base adjacent to the pivot axis line for the striker and having an eye at its top end, an elongate trigger finger having a loop at one end loosely engaged through said eye to form a substantially universal loose coupling with the top end of the support member at an elevation above said axis line and to hang down at one side of the support member, a short straight keeper member operatively coupled at one end to and supported by the base adjacent to the lower end of said support member and having a free end extending substantially perpendicularly to said axis line, said trigger finger being adapted to have its free end engaged in selected positions of adjustment along and against the side of said keeper member and to secure said hold-down arm in trap set condition, and a movable trigger member operatively coupled with the trigger finger and adapted upon a prescribed movement to disengage the trigger finger from the keeper.

References Cited in the file of this patent
UNITED STATES PATENTS

| | | |
|---|---|---|
| 725,040 | Chase | Apr. 14, 1903 |
| 1,596,351 | Hagermann | Aug. 17, 1926 |
| 1,641,033 | Hagermann | Aug. 30, 1927 |